(12) United States Patent
Park et al.

(10) Patent No.: US 6,992,999 B2
(45) Date of Patent: Jan. 31, 2006

(54) METHOD FOR TRANSMITTING LONG CODE STATE INFORMATION IN ASYNCHRONOUS MOBILE COMMUNICATION SYSTEM

(75) Inventors: Jae-Hong Park, Ichon-shi (KR); Chong-Won Lee, Ichon-shi (KR); Yu-Ro Lee, Ichon-shi (KR); Ho-Geun Lee, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 675 days.

(21) Appl. No.: 09/767,001

(22) Filed: Jan. 22, 2001

(65) Prior Publication Data

US 2001/0009543 A1   Jul. 26, 2001

(30) Foreign Application Priority Data

Jan. 22, 2000   (KR) .................... 2000-3097

(51) Int. Cl.
*H04Q 7/00* (2006.01)
(52) U.S. Cl. ........................ 370/332; 370/335
(58) Field of Classification Search ............ 370/331, 370/335, 332, 342, 465
See application file for complete search history.

(56) References Cited

U.S. PATENT DOCUMENTS

| | | | |
|---|---|---|---|
| 5,982,758 A | 11/1999 | Hamdy | 370/331 |
| 6,246,673 B1 * | 6/2001 | Tiedemann et al. | 370/333 |
| 6,289,007 B1 * | 9/2001 | Kim et al. | 370/331 |
| 6,704,581 B1 * | 3/2004 | Park et al. | 455/553.1 |

* cited by examiner

*Primary Examiner*—Chau Nguyen
*Assistant Examiner*—Ian N. Moore
(74) *Attorney, Agent, or Firm*—McDonnell Boehnen Hulbert & Berghoff LLP

(57) ABSTRACT

In a handover from an asynchronous radio network to a synchronous system, long code state information and activation time are transmitted. The method of transmitting long code state information and activation time includes the step of acquiring handover-related information from a neighboring synchronous system by the asynchronous radio network. In the handover, the synchronous system transmit a first message including activation time information and long code state information to the mobile station by the asynchronous radio network and after receiving the activation time information and the long code state information, makes use of the long code state information based on the activation time information by the mobile station.

7 Claims, 21 Drawing Sheets

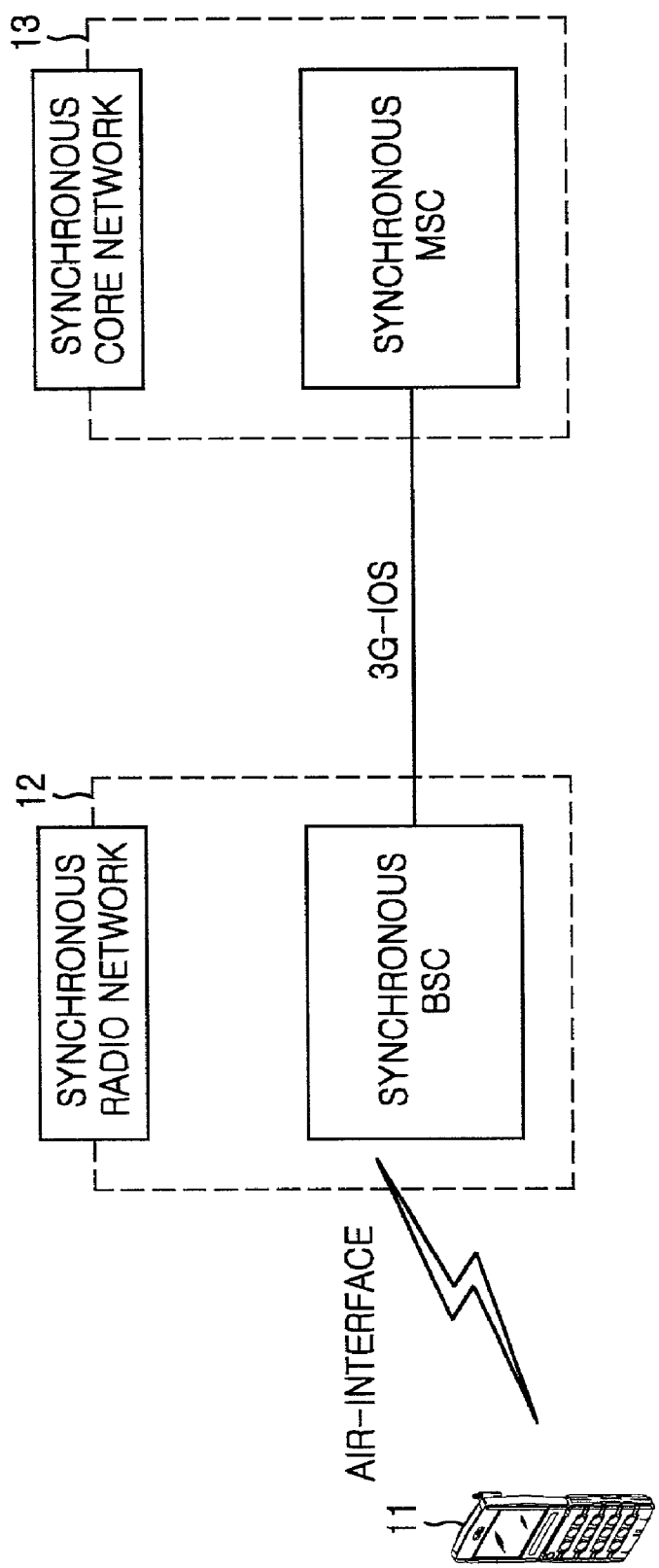

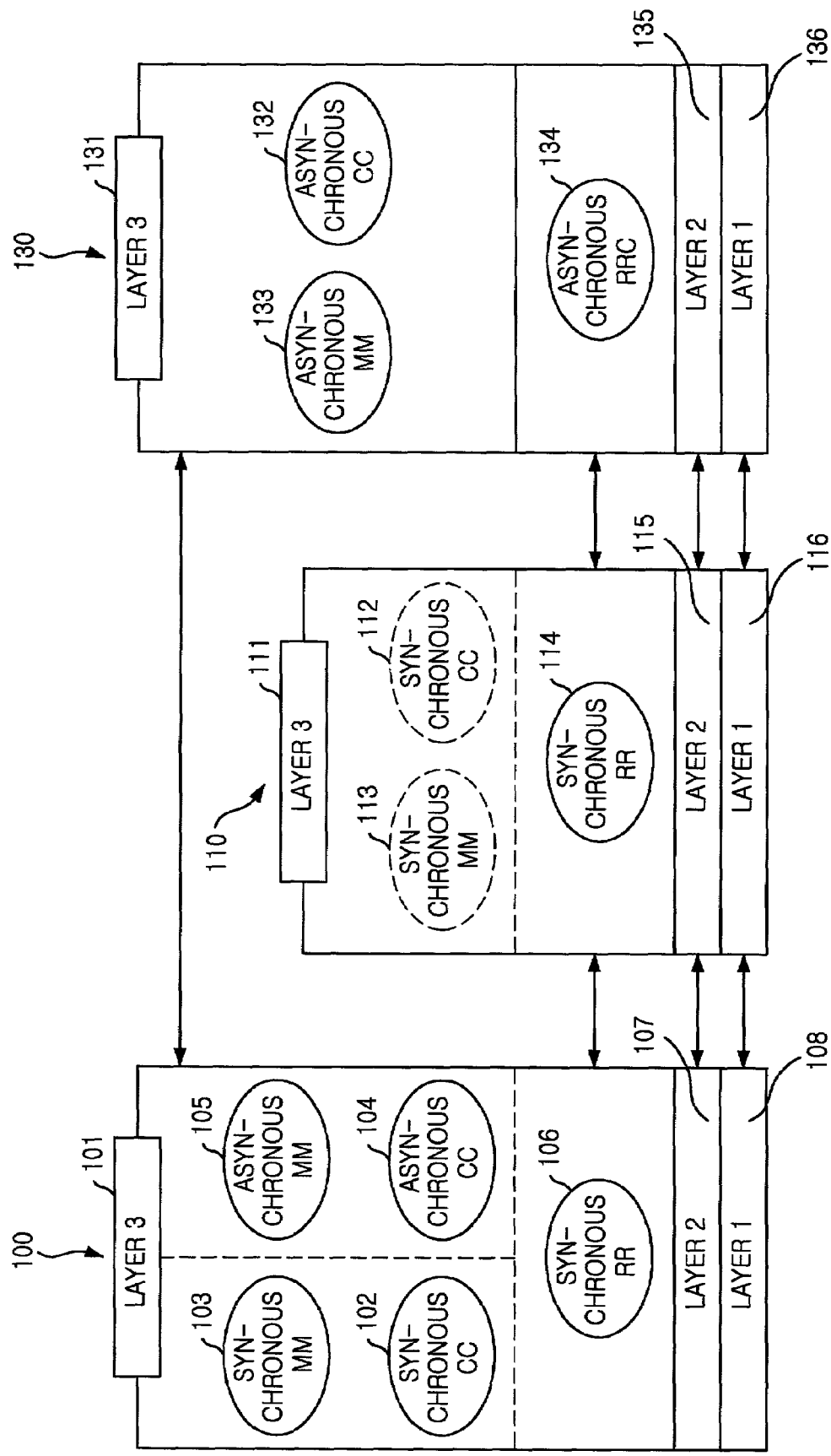

FIG. 6

| INFORMATION ELEMENT | PRESENCE | MULTI | IE TYPE AND REFERENCE | SEMANTICS DESCRIPTION |
|---|---|---|---|---|
| MESSAGE TYPE | M | | | |
| UE INFORMATION ELEMENTS | | | | |
| INTEGRITY CHECK INFO | O | | | |
| ACTIVATION TIME | O | | | |
| OTHER INFORMATION ELEMENTS | | | | |
| INTER-SYSTEM MESSAGE | M | | | |

FIG. 7

| INFORMATION ELEMENT/ GROUP NAME | PRESENCE | RANGE | IE TYPE AND REFERENCE | SEMANTICS DESCRIPTION |
|---|---|---|---|---|
| SYSTEM TYPE | M | | ENUMERATED (GSM, 1..15) | |
| MESSAGE(S) | M | 1..<MAXINTERSYSMESSAGES> | BITSTRING (1..512) | FORMATTED AND CODED ACCORDING TO SPECIFICATION FOR THE INDICATED SYSTEM TYPE SEE NOTE 1 |
| | | | | |

| RANGE BOUND | EXPLANATION |
|---|---|
| MAXINTERSYSMESSAGES(=4) | MAXIMUM NUMBER OF INTER SYSTEM MESSAGES TO SEND |

NOTE 1: FOR INTER-SYSTEM HANDOVERS TO IS 2000 SYSTEM, THIS FIELD SHALL CONSIST OF THE UNIVERSAL HANDOFF DIRECTION MESSAGE, DESCRIBED IN SECTION 3.7.3.3.2.36 OF TIA/EIA IS-2000.5

FIG. 10A

| INFORMATION ELEMENT/ GROUP NAME | PRESENCE | RANGE | IE TYPE AND REFERENCE | SEMANTICS DESCRIPTION |
|---|---|---|---|---|
| SYSTEM TYPE | M | | ENUMERATED (GSM, 1..15) | |
| MESSAGE(S) | M | 1..<MAXINTERSYSMESSAGES> | BITSTRING (1..512) | FORMATTED AND CODED ACCORDING TO SPECIFICATION FOR THE INDICATED SYSTEM TYPE SEE NOTE 1, NOTE 2 |
| | | | | |

| RANGE BOUND | EXPLANATION |
|---|---|
| MAXINTERSYSMESSAGES(=4) | MAXIMUM NUMBER OF INTER SYSTEM MESSAGES TO SEND |

NOTE 1: FOR INTER-SYSTEM HANDOVERS TO IS 2000 SYSTEM, THIS FIELD SHALL CONSIST OF THE UNIVERSAL HANDOFF DIRECTION MESSAGE, DESCRIBED IN SECTION 3.7.3.3.2.36 OF TIA/EIA IS-2000.5

NOTE 2: FOR INTER-SYSTEM HANDOVERS TO IS 2000 SYSTEM, THIS FIELD SHALL CONSIST OF LONG CODE STATE DESCRIBED IN SECTION 3.7.2.3.2.6 OF TIA/EIA IS-2000.5

FIG. 10B

| INFORMATION ELEMENT/ GROUP NAME | PRESENCE | RANGE | IE TYPE AND REFERENCE | SEMANTICS DESCRIPTION |
|---|---|---|---|---|
| SYSTEM TYPE | M | | ENUMERATED (GSM, 1..15) | |
| CHOICE SYSTEM | | | | |
| IS2000 | | | | |
| MESSAGE(S) | M | 1..<MAXINTERSYSMESSAGES> | BITSTRING (1..512) | FORMATTED AND CODED ACCORDING TO SPECIFICATION FOR THE INDICATED SYSTEM TYPE AND CONDITION. SEE NOTE 1 |
| LC_STATE | | | BITSTRING (1..42) | FORMATTED AND CODED ACCORDING TO SPECIFICATION FOR THE INDICATED SYSTEM TYPE AND CONDITION. SEE NOTE 1 |

| RANGE BOUND | EXPLANATION |
|---|---|
| MAXINTERSYSMESSAGES(=4) | MAXIMUM NUMBER OF INTER SYSTEM MESSAGES TO SEND |

| CHOICE SYSTEM | CONDITION UNDER WHICH THE GIVEN SYSTEM IS CHOSEN |
|---|---|
| IS-2000 | USED WHEN THE TARGET SYSTEM IS IS-2000 |

NOTE 1: FOR INTER-SYSTEM HANDOVERS TO IS 2000 SYSTEM, THIS FIELD SHALL CONSIST OF THE UNIVERSAL HANDOFF DIRECTION MESSAGE, DESCRIBED IN SECTION 3.7.3.3.2.36 OF TIA/EIA IS-2000.5

NOTE 2: FOR INTER-SYSTEM HANDOVERS TO IS 2000 SYSTEM, THIS FIELD SHALL CONSIST OF LONG CODE STATE DESCRIBED IN SECTION 3.7.2.3.2.6 OF TIA/EIA IS-2000.5

FIG. 11

| INFORMATION ELEMENT/ GROUP NAME | PRESENCE | RANGE | IE TYPE AND REFERENCE | SEMANTICS DESCRIPTION |
|---|---|---|---|---|
| ACTIVATION TIME | | | INTEGER(0..255) | CFN [TS 25.402] |

METHOD FOR TRANSMITTING LONG CODE STATE INFORMATION IN ASYNCHRONOUS MOBILE COMMUNICATION SYSTEM

FIELD OF THE INVENTION

This invention relates to a method for a method for transmitting long code state information in an asynchronous mobile communication system; and more particularly, to a method for transmitting long code state information in an asynchronous mobile communication system when performing a handoff from an asynchronous radio network to a synchronous system.

DESCRIPTION OF THE PRIOR ART

In a conventional synchronous mobile communication system, a synchronous radio network, for example, a code division multiple access-2000 (CDMA-2000) radio network, is coupled to a synchronous mobile station and a synchronous core network (CN).

Also, in a conventional asynchronous mobile communication system, an asynchronous radio network, for example, an universal mobile telecommunication system (UMTS) Terrestrial Radio Access Network (UTRAN) is coupled to an asynchronous mobile station and an asynchronous core network. FIG. 1 shows core network interface architectures of the conventional synchronous/asynchronous mobile communication system as mentioned above.

FIG. 1A shows the core network interface architecture of the conventional synchronous mobile communication system. In this drawing, the reference numeral 11 denotes a synchronous mobile station, 12 denotes a synchronous radio network (i.e., a code division multiple access-2000 (CDMA-2000) radio network) which performs a data interfacing operation with the synchronous mobile station 11 and includes a synchronous base transceiver station/base station controller (BTS/BSC), and 13 denotes a synchronous core network which is connected to the synchronous radio network 12 and includes a synchronous mobile services switching center (MSC).

In the above core network interface architecture of the conventional synchronous mobile communication system, the synchronous mobile station 11 can be connected to only the synchronous radio network 12 as well known to one skilled in the art, which is in turn connected to the synchronous core network 13, thereby allowing the synchronous mobile station 11 to be interfaced with only the synchronous core network 13.

FIG. 1B shows the core network interface architecture of the conventional asynchronous mobile communication system. In this drawing, the reference numeral 21 denotes an asynchronous mobile station, 22 denotes an asynchronous radio network (i.e., a UTRAN) which includes a base transceiver station (BTS) and a radio network controller (RNC), and 23 denotes an asynchronous core network which includes an asynchronous mobile services switching center (MSC) connected to the UTRAN 22.

In the above core network interface architecture of the conventional asynchronous mobile communication system, the asynchronous mobile station 21 is connected to the asynchronous radio network 22 (i.e., UTRAN) which is in turn connected to the asynchronous core network 23, thereby allowing the asynchronous mobile station 21 to perform a data interfacing operation with the asynchronous core network 23.

FIG. 2 shows layered protocol structures of the conventional synchronous/asynchronous mobile communication system as mentioned above.

FIG. 2A shows the layered protocol structure of the conventional synchronous mobile communication system. In this drawing, the reference numeral 30 denotes a synchronous mobile station, 40 a synchronous radio network and 50 a synchronous core network connected to the synchronous radio network 40.

The synchronous mobile station 30 comprises a layer 3 31, a layer 2 35 and a layer 1 36. The layer 3 31 includes a synchronous call control (CC) entity 32 for management of a call and a synchronous mobility management (MM) entity 33 for management of a mobility.

In synchronous system, the synchronous RR sub layer is not apparently separated from the others in the layer 3 31.

The RR sub layer offers data transfer services on primitive to a lower layer (RLC sub layer) and handles a control plane signaling of the layer 3 31 between a mobile station (MS) and a synchronous radio network. The RR sub layer manages a radio resource. Also, the RR sub layer assigns/reconfigures/releases the radio resource to the MS/a base station (BS).

The CC entity handles a call control signaling of layer 3 between the MSs and the synchronous radio network.

The MM entity handles a mobility management signaling of layer 3 between the MSs and the synchronous radio network.

The layers 3 to 1 31, 35 and 36 in the synchronous mobile station 30 communicate with corresponding layers 41, 45 and 46 in the synchronous radio network 40.

The synchronous radio network 40 comprises a layer 3 41, a layer 2 45 and a layer 1 46. The layers 3 to 1 in the synchronous radio network 40 correspond respectively to those in the synchronous mobile station 30.

The layers 3 to 1 41, 45 and 46 in the synchronous radio network 40 communicate with corresponding layers 31, 35, 36, 51, 55 and 56 in the synchronous mobile station and the synchronous core network 50.

The synchronous core network 50 comprises a layer 3 51, a layer 2 55 and a layer 1 56. The layers 3 to 1 in the synchronous radio network 50 correspond respectively to those in the synchronous mobile station 30.

The layers 3 to 1 51, 55 and 56 in the synchronous core network 50 communicate with corresponding layers 41, 45 and 46 in the synchronous radio network 40.

In the conventional synchronous mobile station and radio network as the layered protocol structure, the synchronous mobile station 30 receives a Sync channel message from the synchronous radio network 40 over a Sync channel and acquires information necessary to its connection to the synchronous core network 50, including information related to the synchronous core network 50 and information about the synchronous radio network 40, from the received Sync channel message.

In other words, for interfacing with the synchronous ANSI-41 network via the synchronous radio network, the synchronous mobile station acquires system information (i.e., information related to the radio network and core network) through a system determination sub-state, a pilot channel acquisition sub-state, a Sync channel acquisition sub-state and a timing changing sub-state after it is powered on. FIG. 2B is shows the layered protocol structure of the conventional asynchronous mobile communication system. In this drawing, the reference numeral 60 denotes an asynchronous mobile station, 70 a UTRAN and 80 an asynchronous core network.

The asynchronous mobile station 60 comprises a layer 3 61, a layer 2 65 and a layer 1 66. In particular, the layer 3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part. In the asynchronous system, the asynchronous RRC sub layer is apparently separated from the NAS part. Functions of the asynchronous RRC sub layer are the same as those of the synchronous RR sub layer.

The UTRAN 70 comprises a layer 3 71, a layer 2 73 and a layer 1 74. The layer 3 71 of the UTRAN 70 has no NAS part having asynchronous CC part and asynchronous MM part. The layers 3 to 1 of the UTRAN 70 are connected and correspond respectively to those in the asynchronous mobile station 60 and those in the asynchronous core network 80. However, since the UTRAN 70 does not have the NAS part, i.e., the asynchronous CC part and the asynchronous MM part, the NAS parts of the asynchronous mobile station 60 and the asynchronous core network 80 are coupled to each other not through the UTRAN 70.

The asynchronous core network 80 comprises a layer 3 having a NAS part 81 connected to that of the asynchronous mobile station 60 and a AS part, a layer 2 85 and a layer 1 86 connected respectively to those in the UTRAN 70. The NAS part comprises an asynchronous CC part 82 for management of a call and an asynchronous MM part 83 for management of a mobility.

Functions of the layer 3 to 1 of the asynchronous system are similar with those of the synchronous system except for an operating type. Therefore, detailed description of the layer 3 to 1 will be skipped.

The more detailed descriptions about layered protocol structures are well taught in 3$^{rd}$ Generation Partnership Project (3GPP), Technical Specification Group (TSG) —Radio Access Network (RAN): 3G TS25.301 (Radio Interface Protocol Architecture), 3G TS25.302 (Services provided by the physical layer), 3G TS25.321 (MAC Protocol Specification), 3G TS25.322 (RLC Protocol Specification) and 3G TS25.331 (RRC Protocol Specification) in detail.

In the conventional asynchronous mobile station and radio network having the layered protocol structure, the asynchronous mobile station 60 receives a system information message from the UTRAN 70 over a broadcast control channel (BCCH) and acquires information necessary to its connection to the asynchronous core network 80, including information related to the asynchronous core network 80 and information about the UTRAN 70, from the received system information message.

In the next-generation mobile telecommunication system such as the IMT-2000 system, either the GSM-MAP network used in the above conventional asynchronous mobile communication system or the ANSI-41 network used in the above conventional synchronous mobile communication system should be employed as a core network and needs to perform an international roaming in a synchronous or asynchronous mobile communication system of an IMT-2000 system.

According to network deployment scenarios, the IMT-2000 system can have the following four interface architectures; first: synchronous mobile station—synchronous radio network—synchronous ANSI-41 network, second: synchronous mobile station—synchronous radio network—asynchronous GSM-MAP network, third: asynchronous mobile station—asynchronous radio network—synchronous ANSI-41 network and fourth: asynchronous mobile station—asynchronous radio network asynchronous GSM-MAP network.

FIG. 3 shows core network interface architectures of the next-generation mobile communication system such as the IMT-2000 system.

FIG. 3A shows a synchronous ANSI-41 core network interface architecture of a hybrid type synchronous radio network. In this drawing, the reference numeral 100 denotes a hybrid type synchronous mobile station, 110 a hybrid type synchronous radio network, and 120 a synchronous core network which includes a synchronous mobile services switching center (MSC).

FIG. 3B shows an asynchronous GSM-MAP core network interface architecture of the hybrid type synchronous radio network. In this drawing, the reference numeral 100 denotes a hybrid type synchronous mobile station, 110 a hybrid type synchronous radio network, and 130 an asynchronous core network which includes an asynchronous MSC.

FIG. 3C shows an asynchronous GSM-MAP core network interface architecture of a hybrid type asynchronous radio network. In this drawing, the reference numeral 210 denotes a hybrid type asynchronous mobile station, 220 denotes a hybrid type UTRAN which is a hybrid type asynchronous radio network, and 230 denotes an asynchronous core network which is connected to the hybrid type UTRAN 220 and includes an asynchronous MSC.

FIG. 3D shows a synchronous ANSI-41 core network interface architecture of the hybrid type asynchronous radio network. In this drawing, the reference numeral 210 denotes a hybrid type asynchronous mobile station, 220 denotes a hybrid type UTRAN which is a hybrid type asynchronous radio network, and 240 denotes a synchronous core network which is connected to the hybrid type UTRAN 220 and includes a synchronous MSC.

In order to be operable adaptively to the above four interface architectures, each of the hybrid type synchronous and asynchronous mobile stations in the next-generation mobile communication system has both asynchronous CC and MM protocol entities serving for the GSM-MAP core network and synchronous CC and MM protocol entities serving for the ANSI-41 core network at the layer 3 in the protocol stack structure, which is a different from each of the conventional synchronous and asynchronous mobile stations.

FIG. 4 shows layered protocol structures of the next-generation mobile communication system.

FIG. 4A shows the layered protocol structure of a hybrid type synchronous mobile station, a hybrid type synchronous radio network and the synchronous ANSI-41 core network. In this drawing, the reference numeral 100 denotes a hybrid type synchronous mobile station, 110 denotes a hybrid type synchronous radio network, and 120 denotes an ANSI-41 core network which is a synchronous core network connected to the hybrid type synchronous radio network 110.

The hybrid type synchronous mobile station 100 comprises a layer 3 101, a layer 2 107 and a layer 1 108. The layer 3 101 comprises a synchronous CC part 102, a synchronous MM part 103, an asynchronous CC part 104, an asynchronous MM part 105 and a synchronous radio resource part 106. The hybrid type synchronous mobile station 100 selectively makes a CC/MM protocol active according to a core network operating type. Information for identifying the core network operating type is given to the hybrid type synchronous mobile station 100.

For example, if the hybrid type synchronous mobile station 100 is currently connected to the ANSI-41 core network 120, the layer 3 101 therein activates protocols of the synchronous CC part 102 and synchronous MM part 103 to perform a message interfacing operation with the ANSI-41 core network 120.

The hybrid type synchronous radio network 110 comprises a layer 3 111, a layer 2 115 and a layer 1 116, which activate their protocols corresponding respectively to those in the hybrid type synchronous mobile station 100 and those in the ANSI-41 core network 120 to transmit and receive messages.

The ANSI-41 core network 120 comprises a layer 3 121, a layer 2 125 and a layer 1 126. The layer 3 121 comprises a synchronous CC part 122, a synchronous MM part 123 and a synchronous RR part 124.

In FIG. 4B, the reference numeral 100 denotes a hybrid type synchronous mobile station, 110 denotes a hybrid type synchronous radio network, and 130 denotes a GSM-MAP core network which is an asynchronous core network.

The hybrid type synchronous mobile station 100 comprises a layer 3 101 having a NAS part and an AS part, a layer 2 107 and a layer 1 108. The NAS part includes a synchronous CC part 102, a synchronous MM part 103, an asynchronous CC part 104 and an asynchronous MM part 105. The AS part includes a synchronous RR part 106. The hybrid type synchronous mobile station 100 selectively makes a CC/MM protocol active according to a core network operating type.

For example, if the hybrid type synchronous mobile station 100 is currently connected to the GSM-MAP core network 130, the layer 3 101 therein activates protocols of the asynchronous CC part 104 and asynchronous MM part 105 to perform a message interfacing operation with the GSM-MAP core network 130.

The hybrid type synchronous radio network 110 comprises a layer 3 111 having a NAS part and an AS part, a layer 2 115 and a layer 1 116, which activate their protocols corresponding respectively to those in the hybrid type synchronous mobile station 100 and those in the GSM-MAP core network 130 to transmit and receive messages.

The GSM-MAP core network 130 comprises a layer 3 131 having a NAS part and an AS part, a layer 2 135 and a layer 1 136. The NAS part includes an asynchronous CC part 132 and an asynchronous MM part 133. The AS part includes an asynchronous RRC part 134.

The layers 3 to 1 of the hybrid type synchronous radio network 110 are connected and correspond respectively to those in the hybrid type synchronous mobile station 100 and those in the asynchronous core network 130. However, the NAS parts of the hybrid type asynchronous mobile station 100 and the asynchronous core network 130 are coupled to each other not through the hybrid type synchronous radio network 110.

FIG. 4C shows layered protocol structures of a hybrid type asynchronous mobile station, a hybrid type asynchronous radio network and a synchronous ANSI-41 core network. In this drawing, the reference numeral 210 denotes a hybrid type asynchronous mobile station, 220 denotes a hybrid type UTRAN which is a hybrid type asynchronous radio network, and 230 denotes an ANSI-41 core network connected to the hybrid type UTRAN 220.

The hybrid type asynchronous mobile station 210 comprises a layer 3 211, a layer 2 217 and a layer 1 218. The layer 1 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous mobile station 210 is currently connected to the ANSI-41 core network 230, the layer 1 therein activates a protocol between the synchronous CC part 212 and synchronous MM part 213 to perform a message interfacing operation with the ANSI-41 core network 230.

FIG. 4D shows layered protocol structures of a hybrid type asynchronous mobile station, a hybrid type asynchronous radio network and an asynchronous GSM-MAP core network. In this drawing, the reference numeral 210 denotes a hybrid type asynchronous mobile station, 220 denotes hybrid type a UTRAN which is a hybrid type asynchronous radio network, and 240 denotes an asynchronous GSM-MAP core network connected to the hybrid type UTRAN 220.

The hybrid type asynchronous mobile station 210 comprises a layer 3 211 having a NAS part and an AS part, a layer 2 217 and a layer 1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. The AS part includes an asynchronous RRC part 216.

The hybrid type asynchronous radio network 220 comprises a layer 3 221 having a NAS part and an AS part, a layer 2 225 and a layer 1 226, which activate their protocols corresponding respectively to those in the hybrid type asynchronous mobile station 210 and those in the GSM-MAP core network 240 to transmit and receive messages.

The GSM-MAP core network 240 comprises a layer 3 241 having a NAS part and an AS part, a layer 2 245 and a layer 1 246. The NAS part includes an asynchronous CC part 242 and an asynchronous MM part 243. The AS part includes an asynchronous RRC part 244.

For example, if the hybrid type asynchronous mobile station 210 is currently connected to the GSM-MAP core network 240, the NAS part therein activates protocols of the asynchronous CC part 214 and asynchronous MM part 215 to perform a message interfacing operation with the GSM-MAP core network 240.

The layers 3 to 1 of the hybrid type asynchronous radio network 220 are connected and correspond respectively to those in the hybrid type synchronous mobile station 210 and those in the asynchronous core network 240. However, the NAS parts of the hybrid type asynchronous mobile station 210 and the asynchronous core network 240 are coupled to each other not through the hybrid type asynchronous mobile station 220.

As described above, IMT-2000 system includes four interlocking structures, and thus interface specifications corresponding to each interlocking structure are required. That is, for processing a handoff and a call in the synchronous/asynchronous mobile communication system, an interface protocol of synchronous/asynchronous communication mode is required, respectively.

FIG. 5 is a pictorial representation of a whole interlocking structure, in case a core network is an ANSI-41 network in accordance with the present invention.

A reference numeral 300 denotes an asynchronous radio network in the asynchronous mobile communication system. A reference numeral 400 denotes a synchronous core network connected to the asynchronous radio network 300. A reference numeral 500 denotes an analog radio network capable of being connected to the synchronous core network 400. A reference numeral 600 denotes a synchronous radio network capable of being connected to the synchronous core network 400.

When both the asynchronous and the synchronous mobile communication systems provide service within an area, a cell configuration is depicted as shown in FIG. 8.

If the cell configuration is given as shown in FIG. 8, there are a couple of cases where the mobile station needs to perform a handoff from the asynchronous mobile communication system to the synchronous mobile communication system. The couple of cases are as follows or more: when the mobile station (MS) moves from an asynchronous mobile communication system area in service to a boundary of the synchronous mobile communication system; when a problem is caused in a radio environment of the asynchronous mobile communication system; and when there is not a neighboring asynchronous mobile communication system whose radio environment is in a proper state.

In the above case, the asynchronous mobile communication system needs to provide the MS with neighbor list information, PN offset information, long code state information or the like concerning the synchronous mobile communication system. However, a conventional inter-system handover message doesn't include the above information.

FIG. 6 shows a configuration of a conventional inter-system handover message in an asynchronous mobile communication system.

As shown in FIG. 6, information element includes message type, UE information elements, integrity check information, activation time, other information elements and inter-system message.

FIG. 7 shows a configuration of a conventional inter-system message included in an inter-system handover message in an asynchronous mobile communication system. The information element included in the inter-system message includes system type information and message information.

Aforementioned referring to FIG. 6 and FIG. 7, it is noted that the handover message doesn't include one or more information elements that are essentially required when a handoff is occurred from the asynchronous mobile communication system to the synchronous mobile communication system.

One of the required information elements is long code state information that is necessary for processing traffic data in the synchronous mobile communication system. The traffic data for the synchronous mobile communication system are represented by long code. The long code is generated based on a time-variant long code state represented by 42-bit and a long code mask specifically defined to respective mobile stations.

In more detail, the long code is a PN period row having a period of $2^{42}-1$ and is used for encoding a forward CDMA channel and spreading a reverse ward CDMA channel signal. Also, the long code is used as information for discriminating the mobile station or a subscriber in a forward traffic channel and a reverse ward traffic channel, guarantees a subscriber's call secrecy to a limited extent and precludes a signal transmitted by the other mobile station from being received.

The long code mask is used as mobile station and system discrimination information such as an electronic serial number (ESN), a mobile station identification number (MIN), a paging channel number and a connection channel number that are represented by 42-bit binary value.

The long code state is used as a seed value that is inputted to a PN generator upon generating the long code.

Here, the long code mask is an invariant value allocated to respective mobile stations, however, the long code state information is time-variant information, and hence an exact long code value needs to be known in order to correctly restore traffic data used in the synchronous system. In other words, the exact long code state information needs to be known at varying time.

In a conventional synchronous system, the long code state information is periodically transmitted to the mobile station through a synchronous channel, and the mobile station makes use of the long code state information 320 ms after the same is received in conformity with a standard defined for the synchronous mobile communication system.

However, there is caused a problem of a call disconnection in case a handoff is occurred from the asynchronous system to the synchronous system and then immediately the long code state information is received and made use of.

That is to say, it takes 240 ms for the mobile station to receive the long code state information from the synchronous system and takes 320 ms after reception for the mobile station to make use of the same. Accordingly, traffic data is not possible to retrieve for 560 ms after the handoff to the synchronous system is occurred, to thereby cause the call disconnection in a situation where a call-continuation is required.

SUMMARY OF THE INVENTION

It is an object of the present invention to provide a method for transmitting information about a synchronous system to an mobile station in an asynchronous mobile communication system in order to perform a handover from an asynchronous radio network to a synchronous system.

In accordance with an aspect of the present invention, there is provided a method for transmitting information about a synchronous system to an mobile station in an asynchronous mobile communication system including one or more mobile station and one or more asynchronous radio network, the method comprising the steps of: by the asynchronous radio network, acquiring handover-related information from a neighboring synchronous system; if a system for a handover is the synchronous system, by the asynchronous radio network, transmitting a first message including activation time information and long code state information to the mobile station; and after receiving the activation time information and the long code state information, by the mobile station, making use of the long code state information based on the activation time information.

BRIEF DESCRIPTION OF THE DRAWINGS

Other objects and aspects of the invention will become apparent from the following description of the embodiments with reference to the accompanying drawings, in which:

FIG. 1A is a pictorial representation illustrating a conventional structure of a synchronous mobile communication system interlocking with a synchronous core network;

FIG. 4B is a schematic diagram representing protocol layers structure in the synchronous mobile communication system interlocking with an asynchronous core network;

FIG. 6 shows a configuration of a conventional inter-system handover message in an asynchronous mobile communication system;

FIG. 7 shows a configuration of a conventional inter-system message included in an inter-system handover message in an asynchronous mobile communication system;

FIG. 10A illustrates one embodiment of a configuration of an inter-system message in accordance with the present invention;

FIG. 10B illustrates another embodiment of a configuration of an inter-system message in accordance with the present invention;

FIG. 11 illustrates a configuration of activation time information in accordance with the present invention;

DETAILED DESCRIPTION OF THE PREFERRED EMBODIMENTS

Figure 1B:
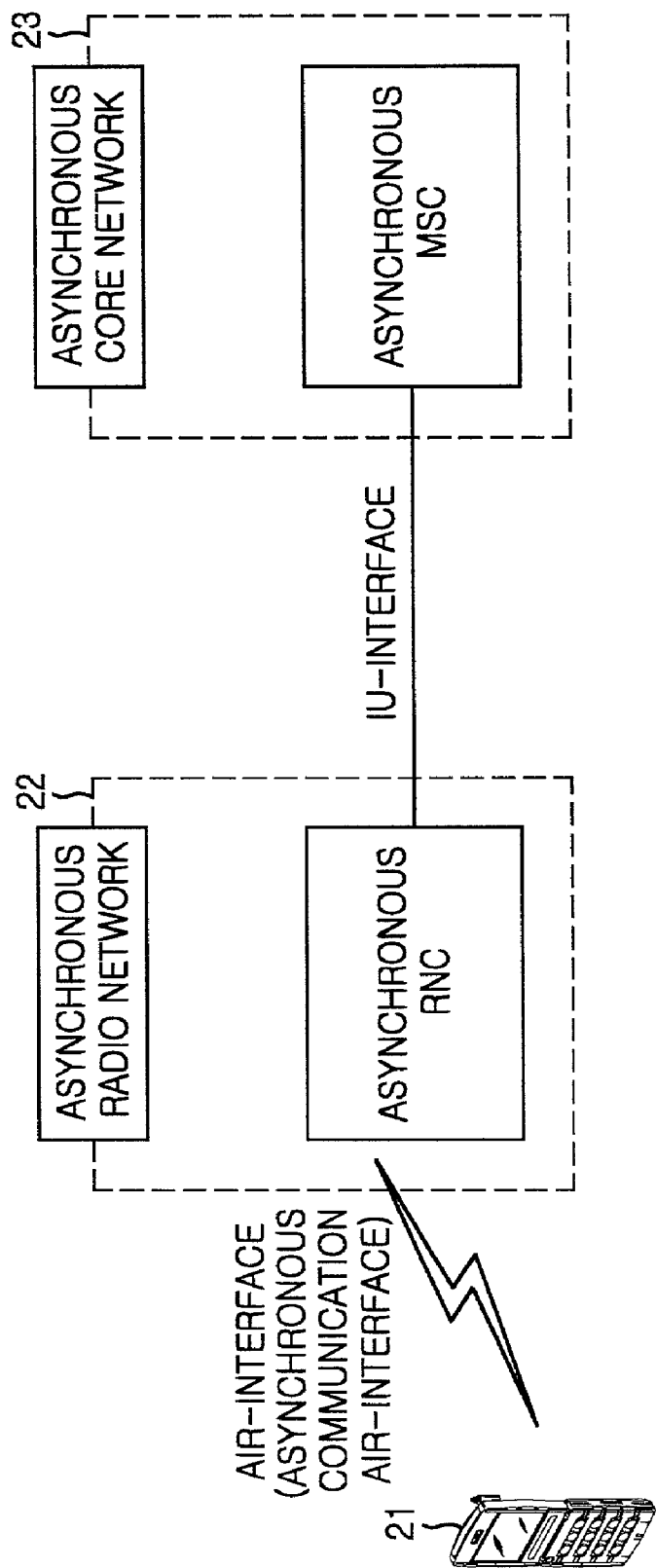
FIG. 1B is a pictorial representation of conventional structuring of an asynchronous mobile communication system interlocking with an asynchronous core network.
Figure 2A:
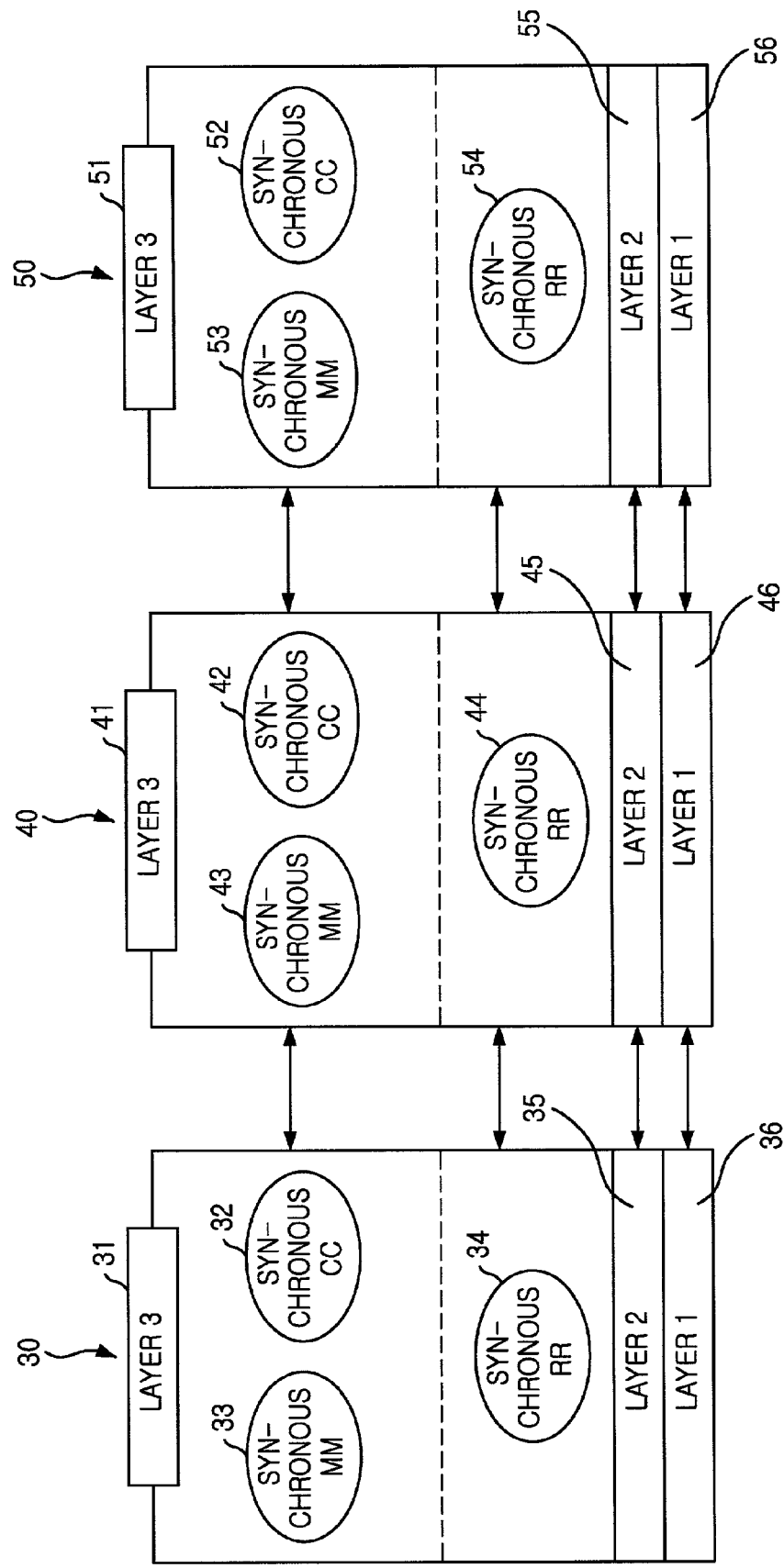
FIG. 2A is a diagram representing protocol structures of each section in the synchronous mobile communication system.
Figure 2B:
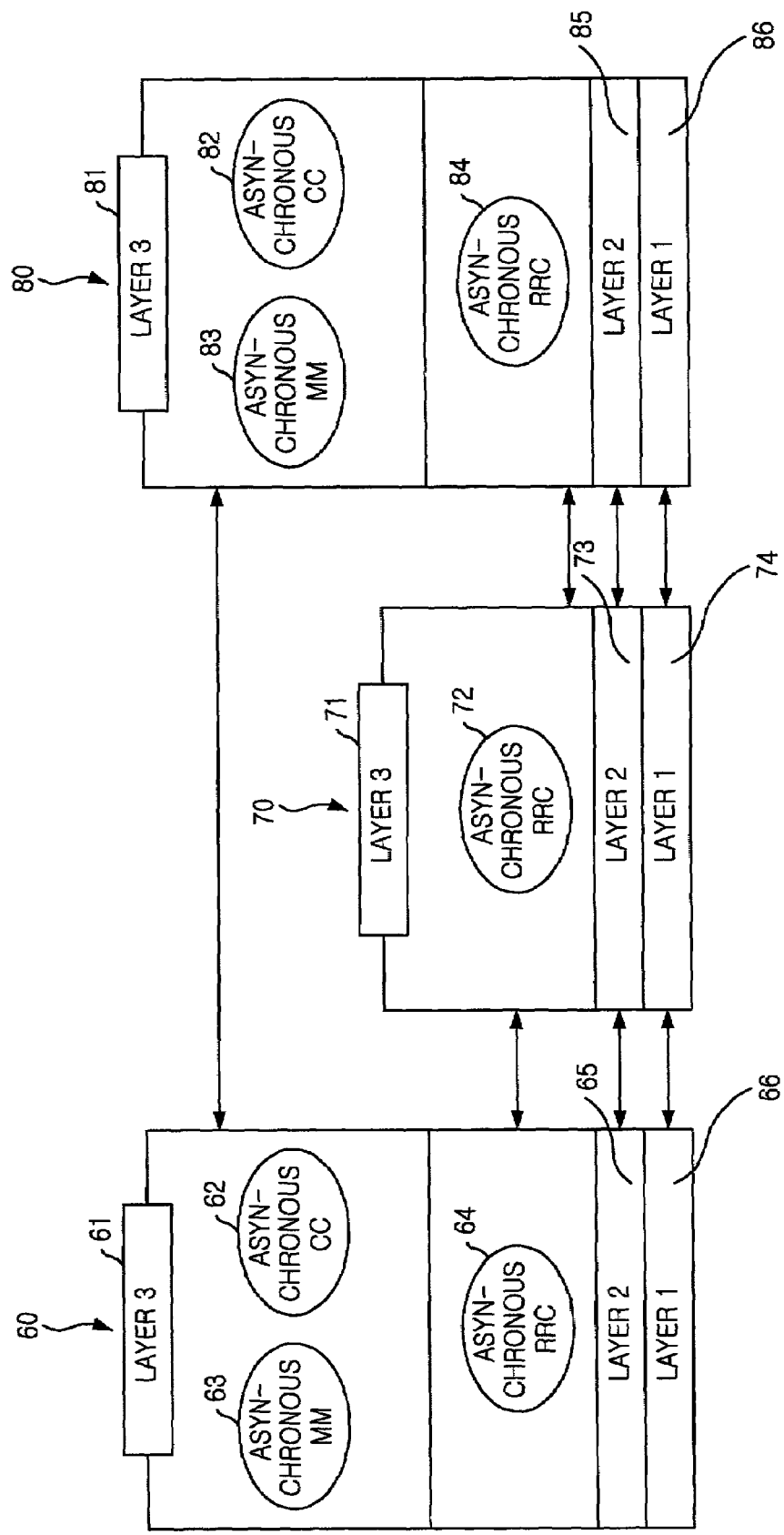
FIG. 2B is a diagram representing protocol structures of each section in the asynchronous mobile communication system.
Figure 3A:
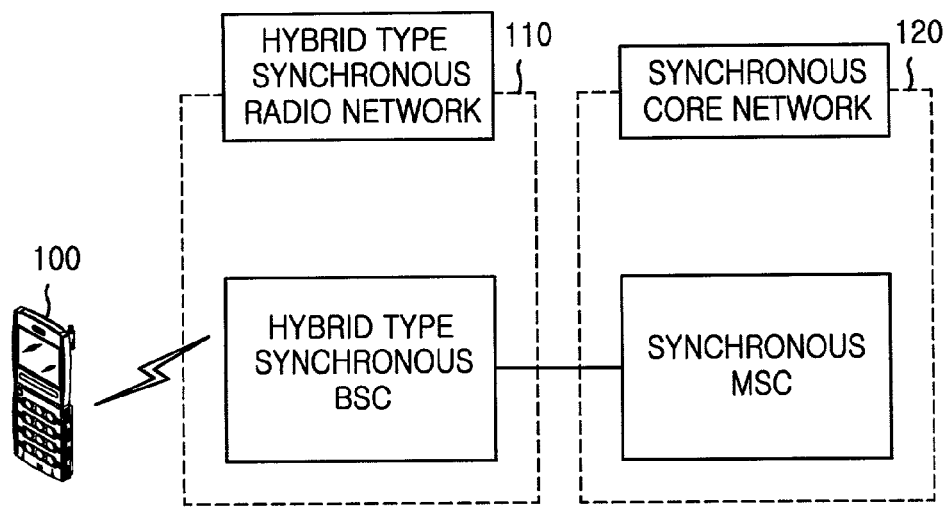
FIG. 3A is a pictorial representation of structure of interlocking with a synchronous ANSI-41 core network in a synchronous mobile communication system.
Figure 3B:
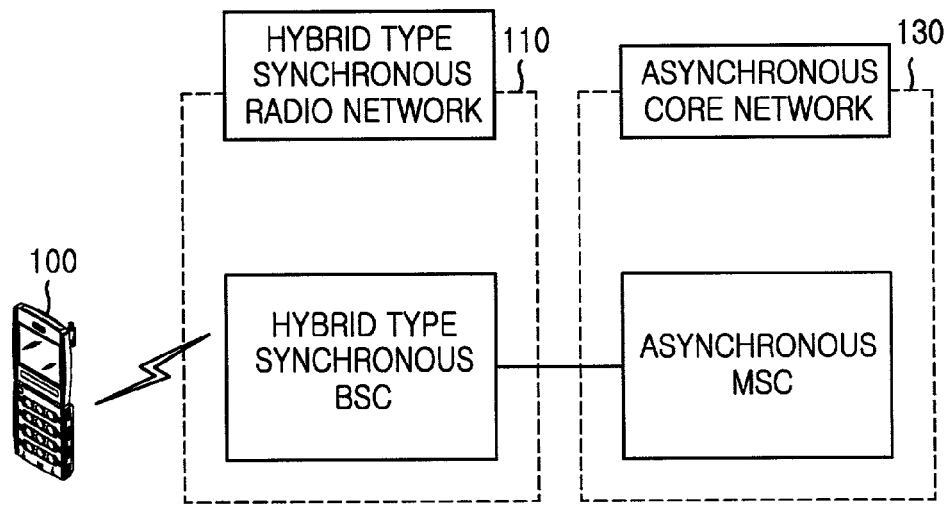
FIG. 3B is a pictorial representation of structure of interlocking with an asynchronous GSM-MAP core network in a synchronous mobile communication system.
Figure 3C:
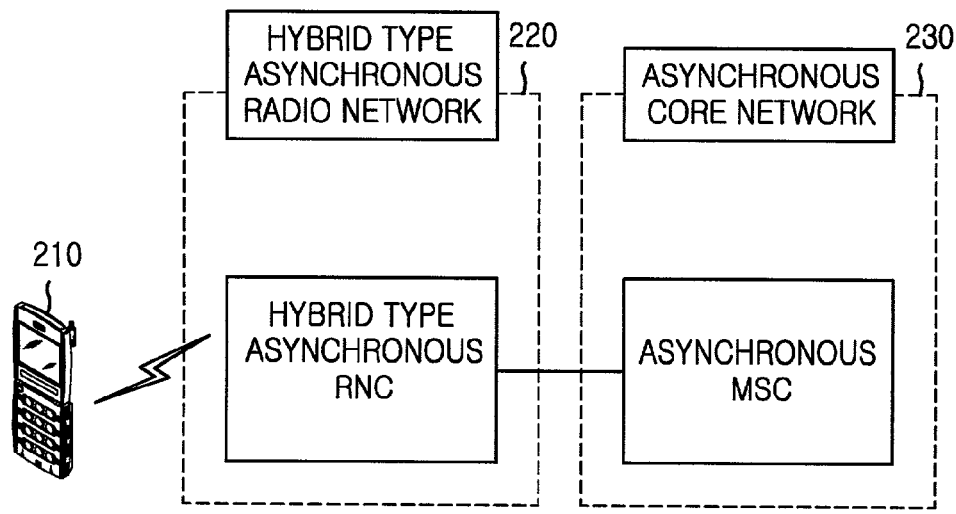
FIG. 3C is a pictorial representation of structure of interlocking with an asynchronous GSM-MAP core network in an asynchronous mobile communication system.
Figure 3D:
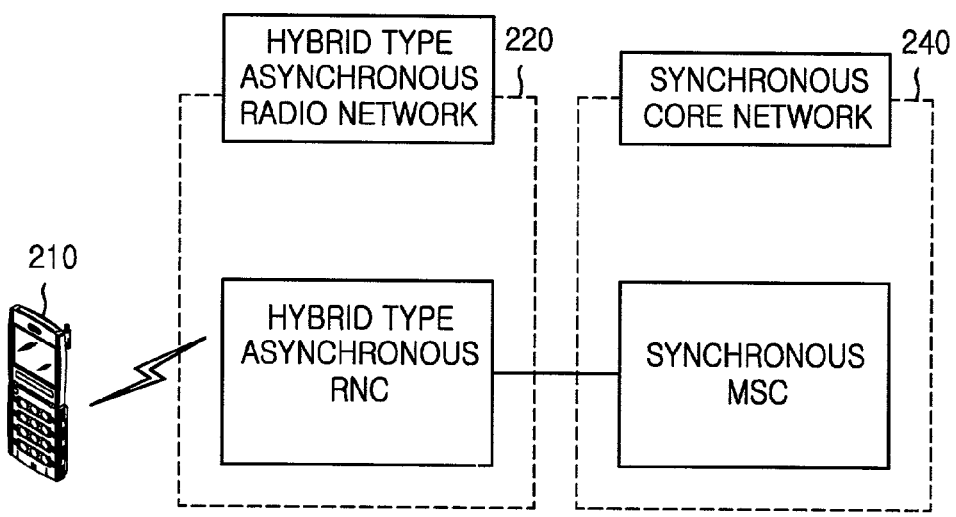
FIG. 3D is a pictorial representation of structure of interlocking with a synchronous ANSI-41 core network in an asynchronous mobile communication system.
Figure 4A:
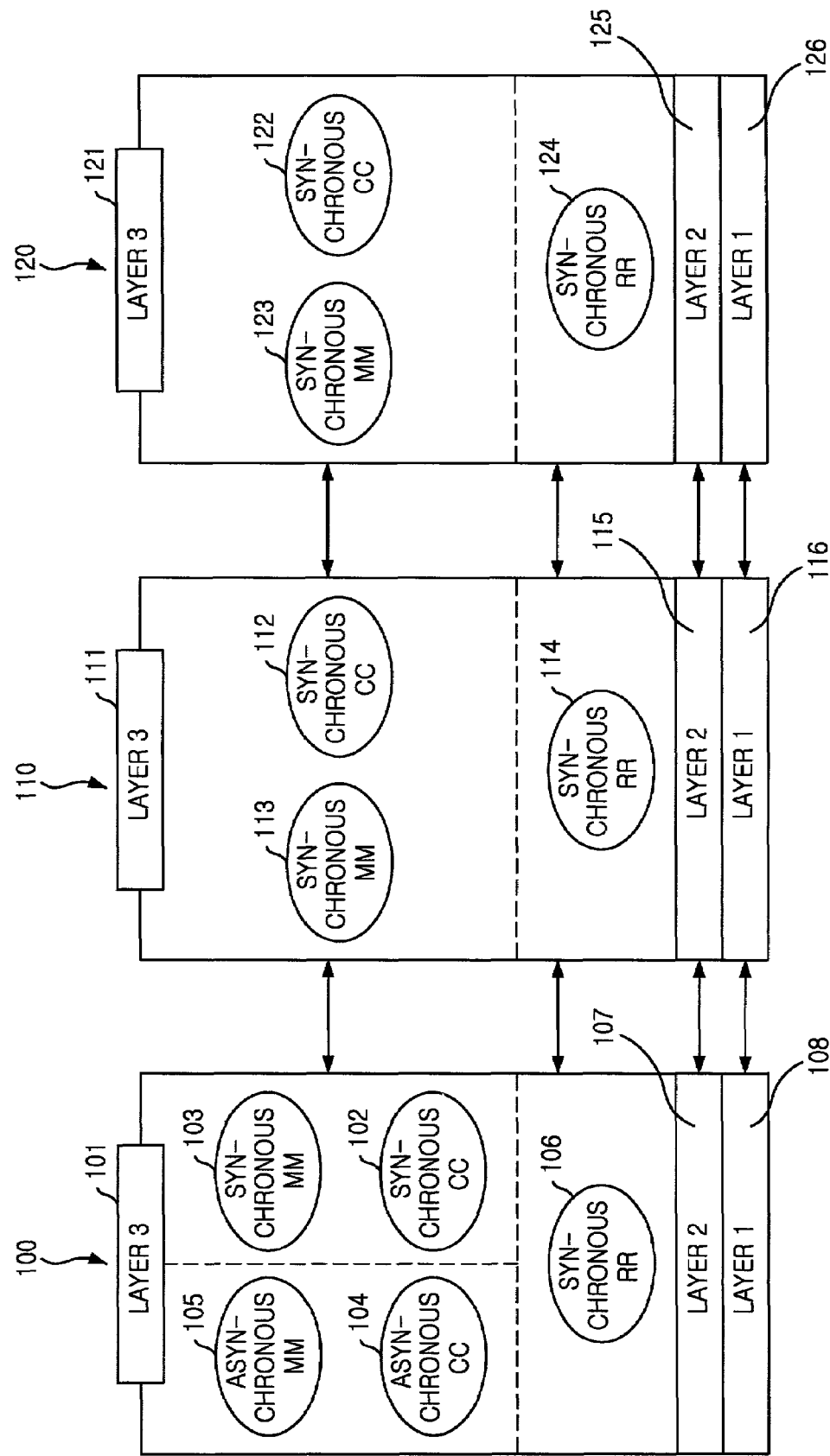
FIG. 4A is a schematic diagram representing protocol layers structure in the synchronous mobile communication system interlocking with the ANSI-41 core network.
Figure 4C:
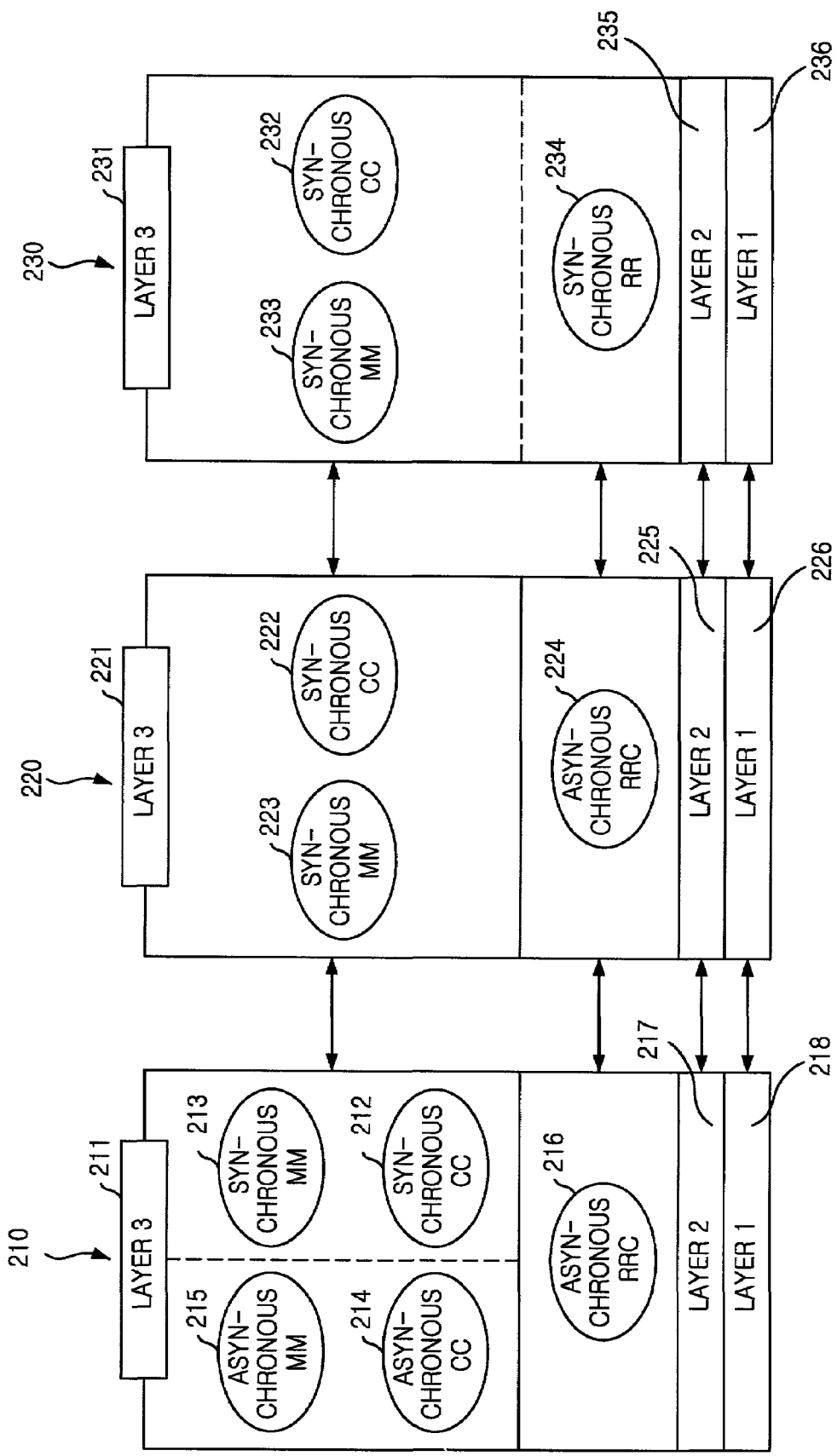
FIG. 4C is a schematic diagram representing protocol layers structure in the asynchronous mobile communication system interlocking with a synchronous ANSI-41 core network.
Figure 4D:
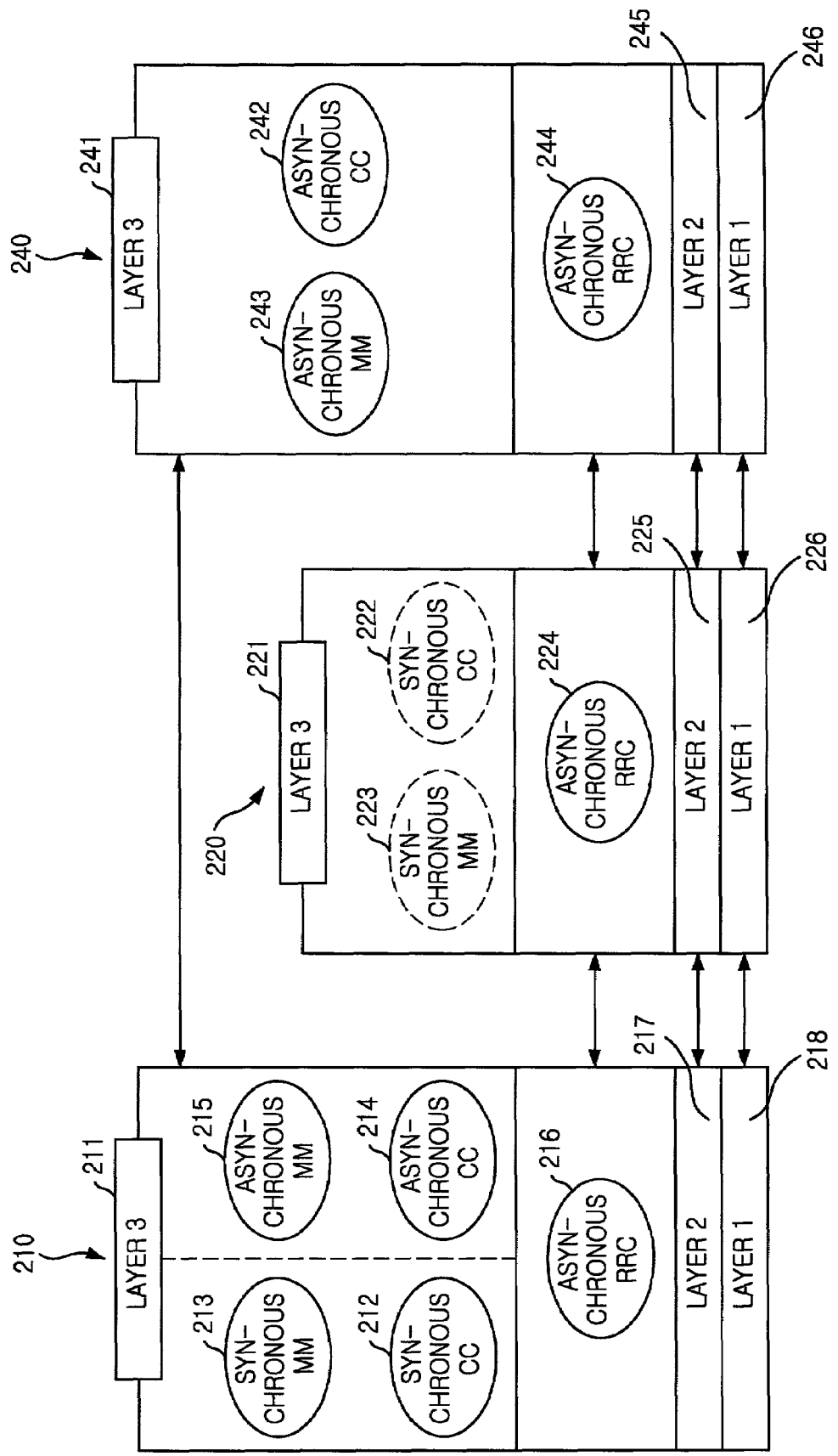
FIG. 4D is a schematic diagram representing protocol layers structure in the asynchronous mobile communication system interlocking with an asynchronous GSM-MAP core network.
Figure 5:
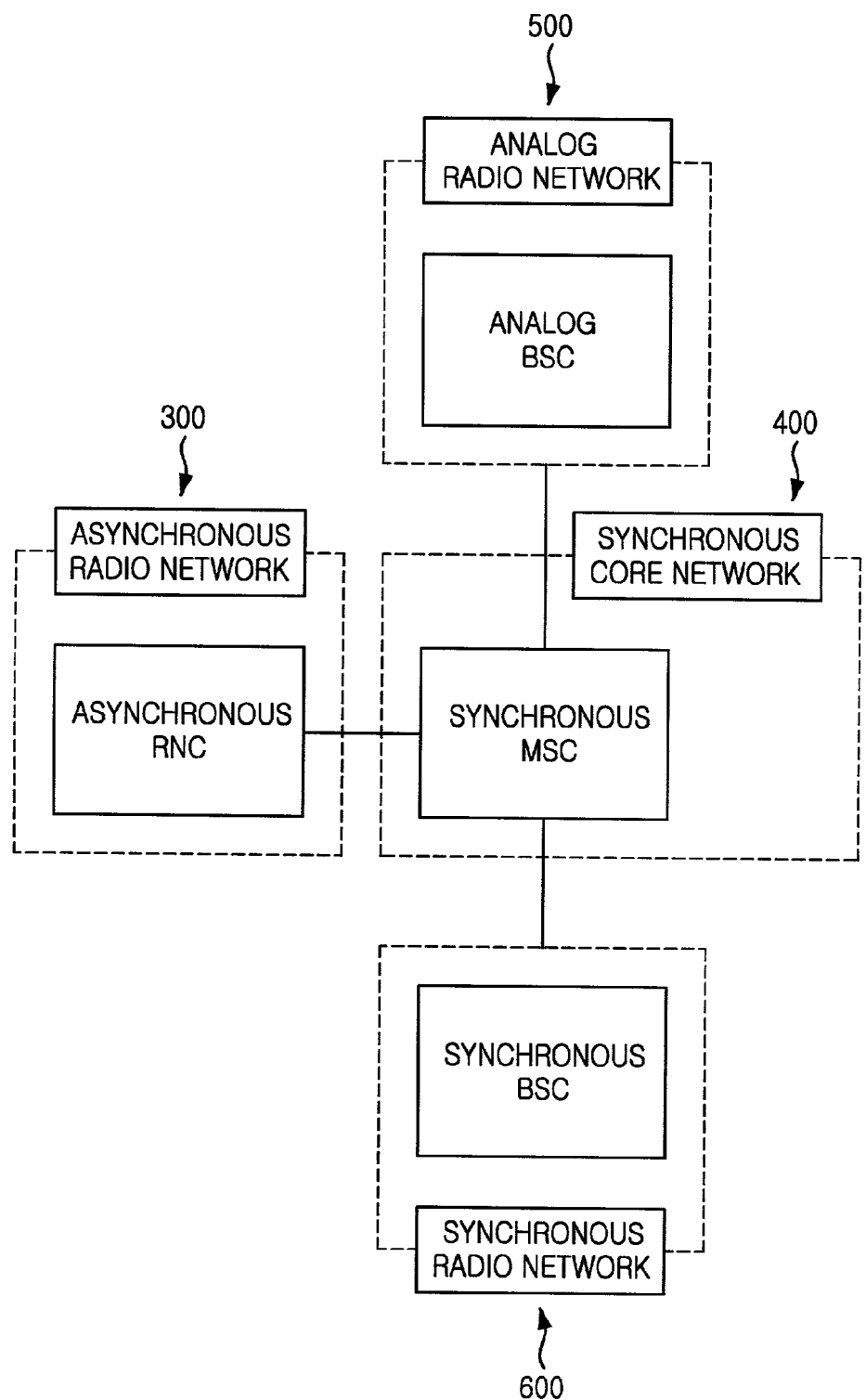
FIG. 5 is a pictorial representation of a whole interlocking structure, in case a core network is an ANSI-41 network.
Figure 8:
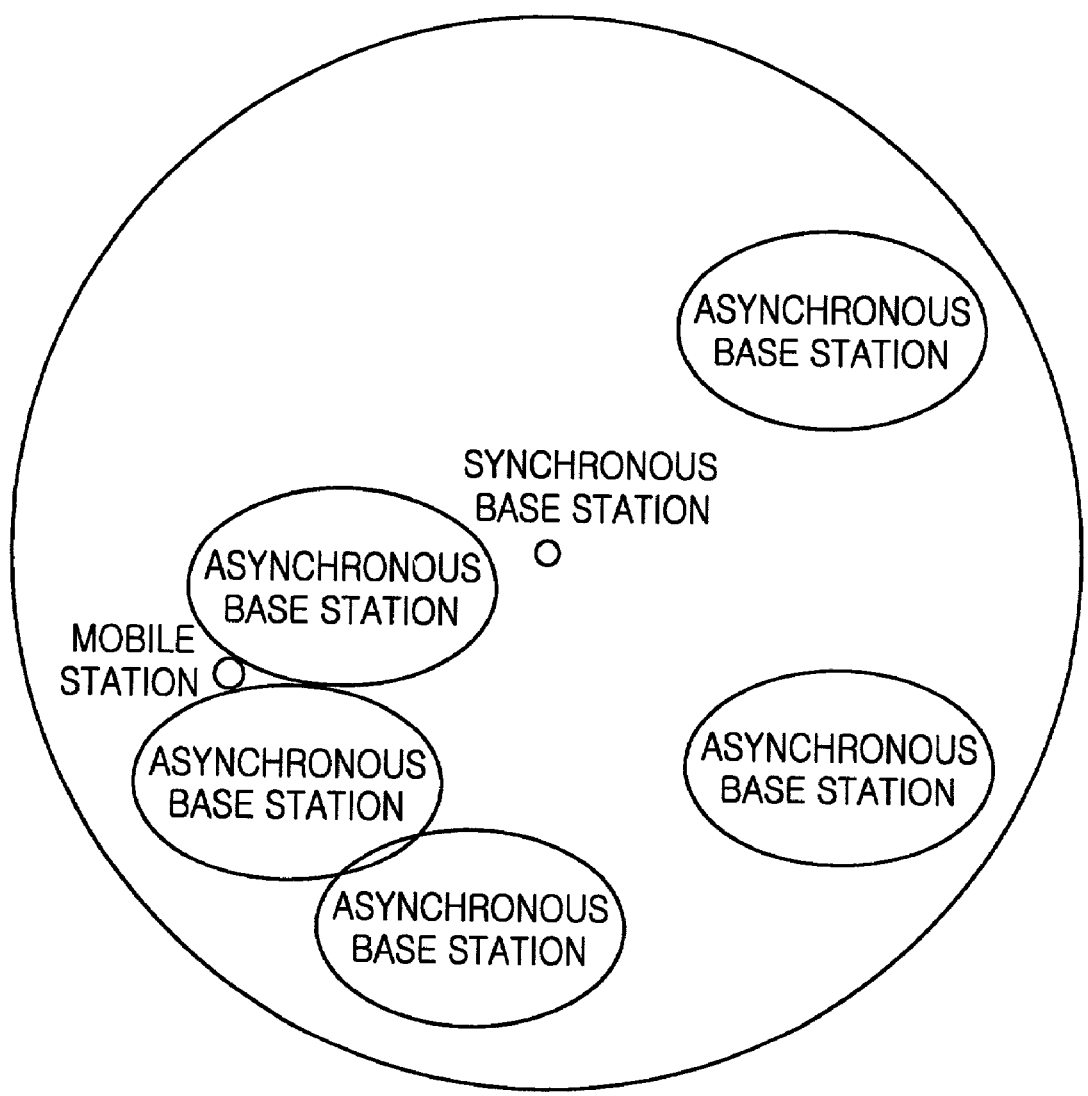
FIG. 8 shows a configuration of a cell including one or more asynchronous base stations and a synchronous base station.
Figure 9A:
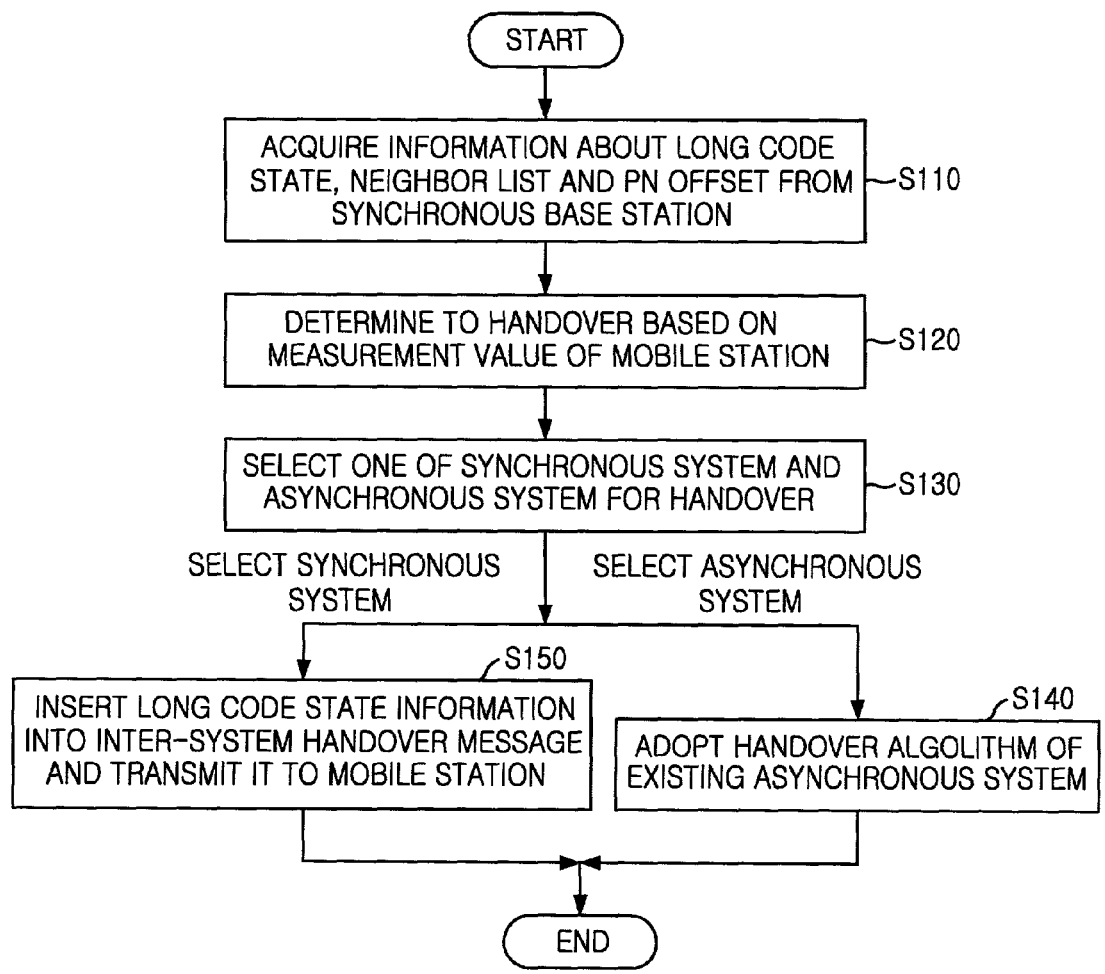
FIG. 9A is a flow chart illustrating a method for transmitting long code state information from an asynchronous Universal mobile telecommunication system Terrestrial Radio Access Network (UTRAN) to an mobile station.

FIG. 9A is a flow chart illustrating a method for transmitting long code state information from an asynchronous Universal mobile telecommunication system Terrestrial Radio Access Network (UTRAN) to an mobile station.

At the step S110, An asynchronous UTRAN receives from a neighboring synchronous base station (BS) long code state information, neighbor list information, PN offset or the like that are necessary information at the time of a handover to the synchronous BS. At this time, the asynchronous UTRAN also receives information about neighboring asynchronous UTRAN at the time of a handover to an asynchronous UTRAN. Then, the asynchronous UTRAN stores the received information in its internal memory.

At the step S120, the UTRAN determines to perform the handover with reference to a measurement value that is transmitted from an mobile station. A way of determination is the same as that of determining to perform the handover in an asynchronous mobile communication system.

At the step S130, the asynchronous UTRAN selects one of the asynchronous UTRAN and the synchronous BS where the handover is possible to perform. A way of selection is the same as a way of selecting an asynchronous UTRAN capable of performing the handover in the asynchronous mobile communication system.

For example, the asynchronous UTRAN can select a system among one or more neighboring systems whose pilot strength is strongest or whose radio environment is in a best state.

At the step S140, if an asynchronous UTRAN is selected, the handover is performed to the selected asynchronous UTRAN based on a handover algorithm used in the conventional asynchronous mobile communication system.

At the step S150, if the synchronous BS is selected, the asynchronous UTRAN inserts the long code state information among information about the selected synchronous BS that are previously stored in the above internal memory, into a message to be transmitted to the mobile station and then transmits the message to the mobile station.

Figure 12A:
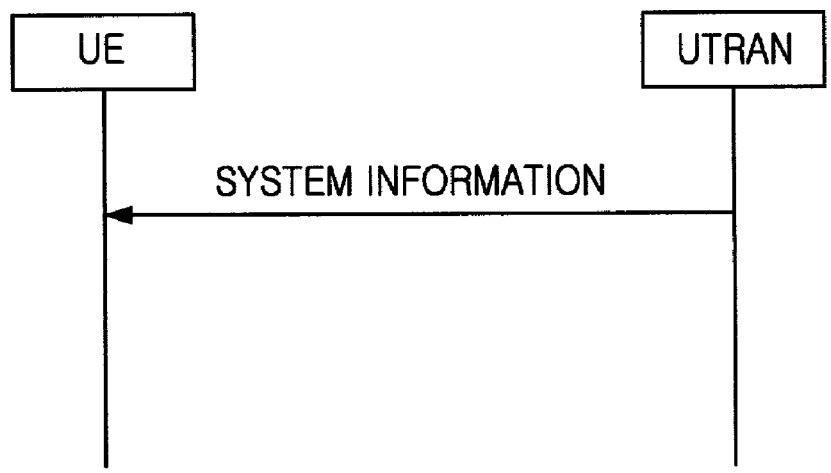
FIG. 12A is a flow chart illustrating a procedure of transmitting long code state information to an mobile station using a system information message.
Figure 12B:
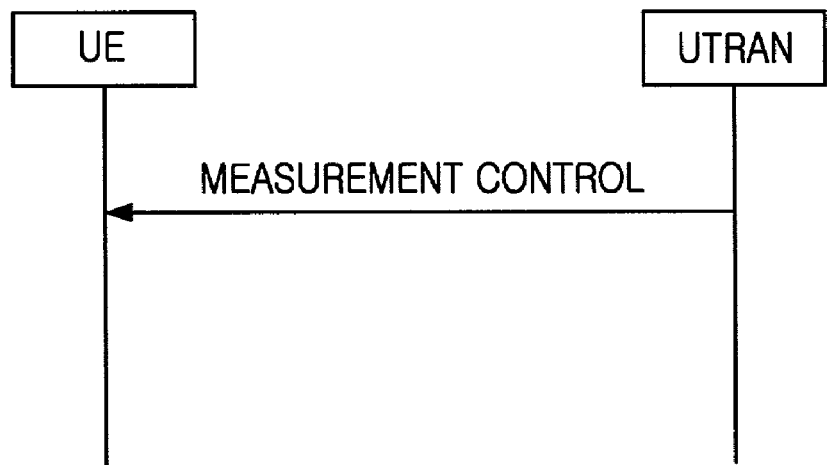
FIG. 12B is a flow chart illustrating a procedure of transmitting long code state information to an mobile station using a measurement control message.
Figure 12C:
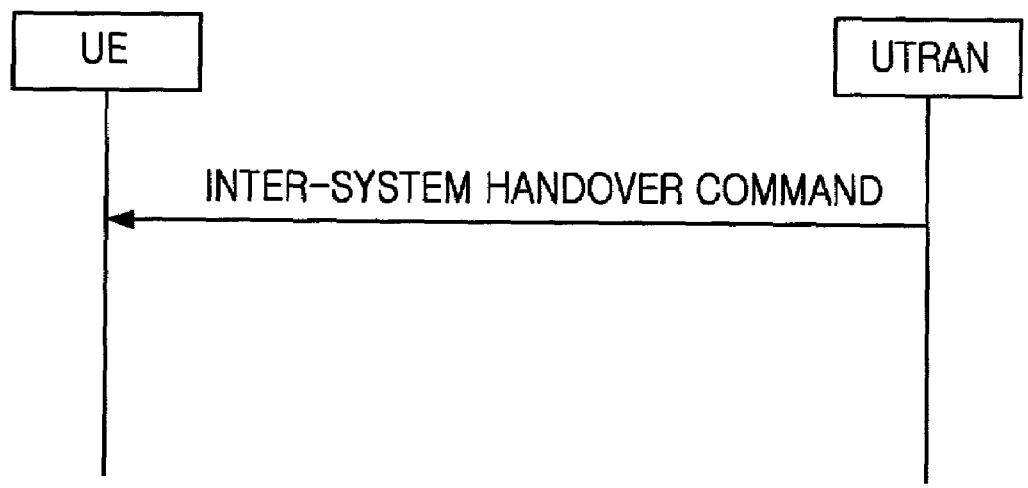
FIG. 12C is a flow chart illustrating a procedure of transmitting long code state information to an mobile station using an inter-system handover message.

In the above, the message to be transmitted to the mobile station can be a system information message that is periodically transmitted to the mobile station via a broadcast channel, as shown in FIG. 12A. Also, The message can be a measurement control message, as shown in FIG. 12B, that the mobile station is to measure surroundings, included in a radio resource control (RRC) message or can be an inter-system handover command message, as shown in FIG. 12C, that is transmitted to the mobile station at the time of the handover.

In the inter-system handover message case, the long code state information is inserted into an inter-system message included in the inter-system handover message and then the inter-system handover message is transmitted to the mobile station.

FIG. 10A illustrates one embodiment of a configuration of an inter-system message in accordance with the present invention in case an asynchronous UTRAN transmits long code state information to an mobile station using an inter-system handover message.

As shown in FIG. 10A, the inter-system message includes a system type field that indicates a type of system and a message field. The long code state information is inserted into the message field and then transmitted to the mobile station.

Noting a semantics description for the message field, a NOTE 1 refers to information included in the inter-system message in the conventional asynchronous mobile communication system and a NOTE 2 includes the long code state information of the synchronous base station for the handover.

FIG. 10B illustrates another embodiment of a configuration of an inter-system message in accordance with the present invention.

As shown in FIG. 10B, the inter-system message further includes a newly generated long code state information field (LC_STATE) in an IS-2000 field in accordance with the present invention. The long code state information is inserted into the long code state information field (LC_STATE) and then transmitted to the mobile station.

FIG. 11 illustrates a configuration of activation time information.

It is informed when the long code state information is to be used based on the activation time information, which is transmitted to the mobile station together with the long code state information.

Figure 9B:
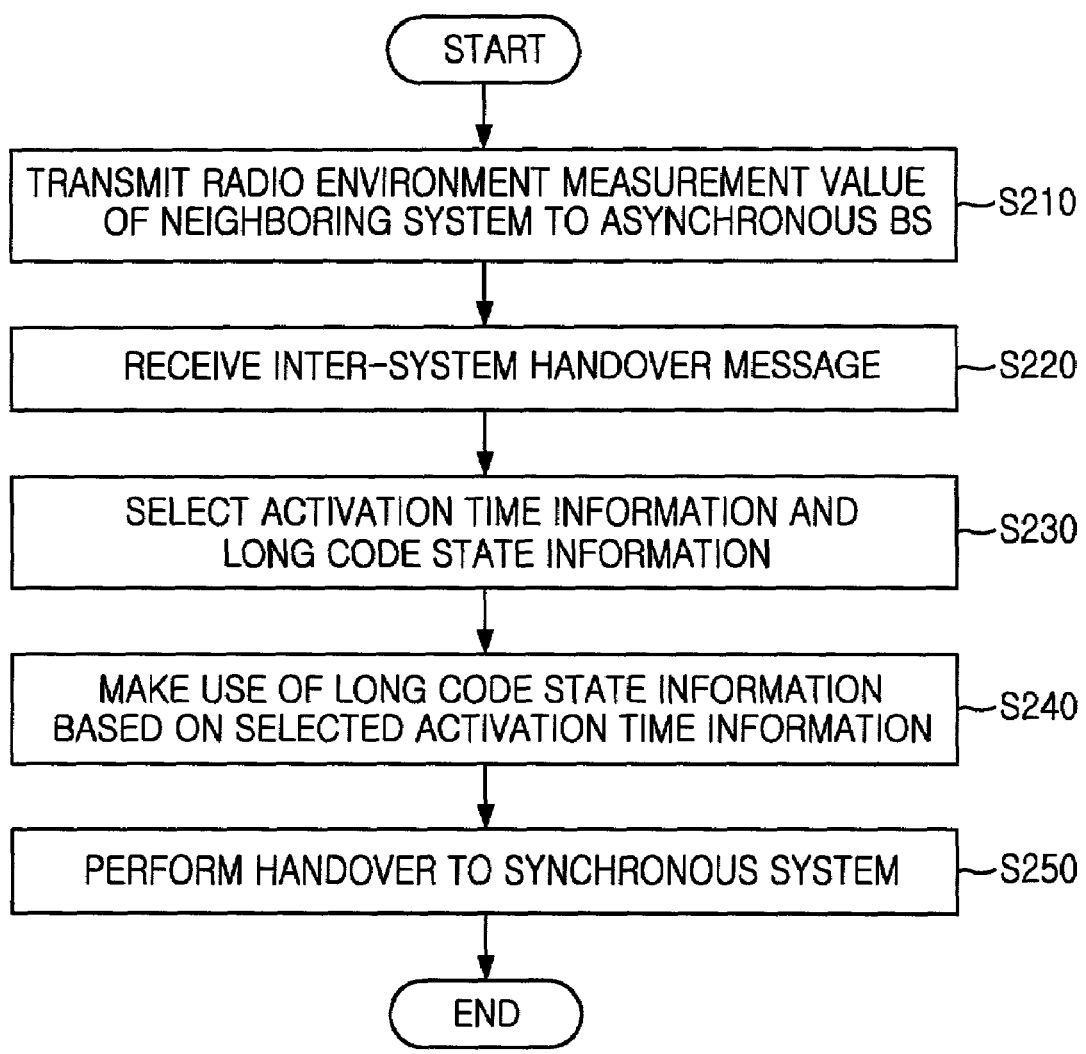
FIG. 9B is a flow chart illustrating a method for receiving and using at an mobile station long code state information transmitted from an asynchronous UTRAN in an asynchronous mobile communication system.

FIG. 9B is a flow chart illustrating a method for receiving and using at an mobile station long code state information transmitted from an asynchronous UTRAN in an asynchronous mobile communication system.

At the step S210, the mobile station measures a radio environment of a neighboring system and then, transmits a measurement value to the asynchronous UTRAN.

At the step S220, the mobile station receives an inter-system handover message from the asynchronous UTRAN.

At the step S230, the mobile station selects activation time information and long code state information from the inter-system handover message by analyzing activation time information field and long code state information field included in the inter-system handover message.

At the step S240, the mobile station makes use of the long code state information according to the activation time information. Aforementioned, the activation time information provides information of time when the mobile station will make use of the long code state information, which the mobile station uses for restoring and spreading traffic data in communicating with the synchronous base station.

At the step S250, the mobile station performs the handover to the synchronous base station.

As aforementioned, instead of the above inter-system handover message, the system information message or the measurement control message can be transmitted to the mobile station from the asynchronous UTRAN at the above step S220.

Consequently, when the mobile station is going to perform the handover from the asynchronous system to the synchronous system, the mobile station can perform a smooth handover to thereby communicate with the synchronous system without a call disconnection because the asynchronous system provides the mobile station with long code state information that is used for the synchronous system.

Although the preferred embodiments of the invention have been disclosed for illustrative purpose, those skilled in the art will appreciate that various modifications, additions, and substitutions are possible, without departing from the scope and spirit of the invention as disclosed in the accompanying claims.

What is claimed is:

1. A method for transmitting information about a synchronous system to a mobile station in an asynchronous mobile communication system including at least one mobile station and at least one asynchronous radio network, the method comprising the steps of:
    a) by the asynchronous radio network, acquiring handover-related information from a plurality of neighboring synchronous systems;
    b) determining to handover based on a measurement value from the mobile station;
    c) if a system for a handover is the synchronous system, by the asynchronous radio network, transmitting a first message including activation time information and long code state information to the mobile station; and
    d) after receiving the activation time information and the long code state information, by the mobile station, making use of the long code state information based on the activation time information,
    wherein the first message further includes an inter-system handover message that is transmitted to the mobile station at the time of the handover from one system to the other system, and the inter-system handover message is transmitted to the mobile station by inserting the long code state information into a first subfield within an inter-system message included in the inter-system handover message in order to provide the mobile station with the long code state information wherein the first subfield is a NOTE 2 field including the long code state information, the NOTE 2 field included in a message filed within the inter-system message.

2. The method as recited in claim 1, wherein the handover-related information includes the long code state information, neighbor list information and PN offset information.

3. The method as recited in claim 1, wherein the first message includes a system information message loaded on a broadcast control channel that is periodically transmitted to the mobile station.

4. The method as recited in claim 1, wherein the first message further includes a measurement control message that the mobile station needs to measure one or more neighboring systems.

5. The method as recited in claim 1, wherein the inter-system handover message further includes another inter-system message having a second subfield in order to inform the mobile station of the long code state information.

6. The method as recited in claim 5, wherein the second subfield is a LC_STATE field including the NOTE 2 field including the long code state information.

7. The method as recited in claim 1, wherein the measurement value is calculated based on a radio environment of each neighboring synchronous system around the mobile station.

* * * * *